Feb. 14, 1950        R. H. GAVER        2,497,403
ROLLER BEARING HOUSING
Filed Sept. 30, 1947        2 Sheets-Sheet 2
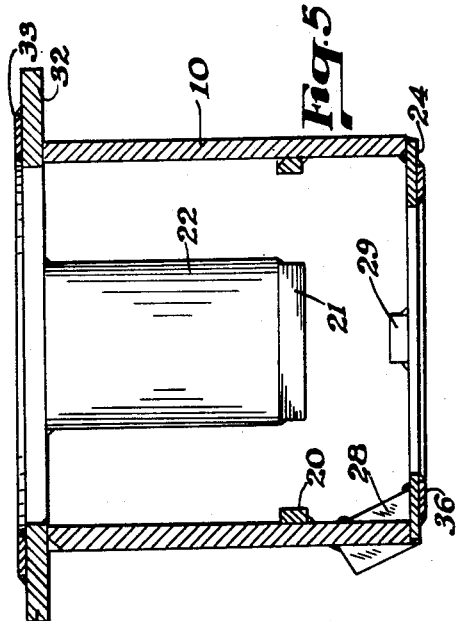
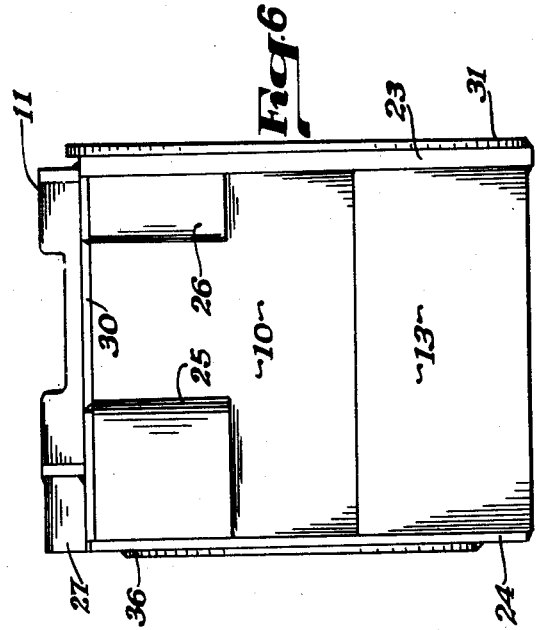
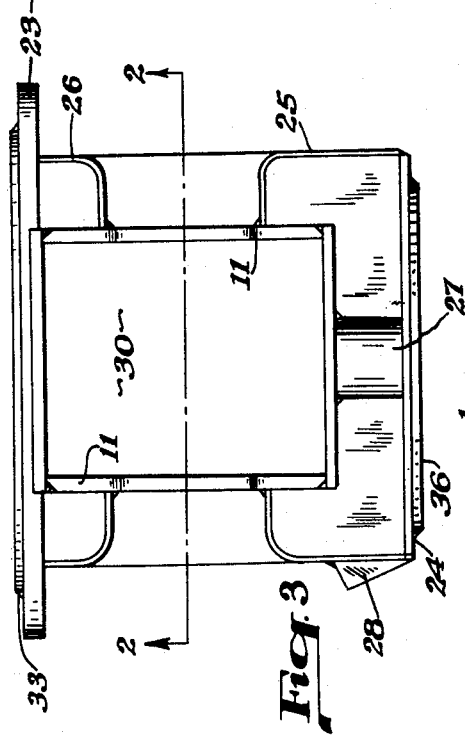
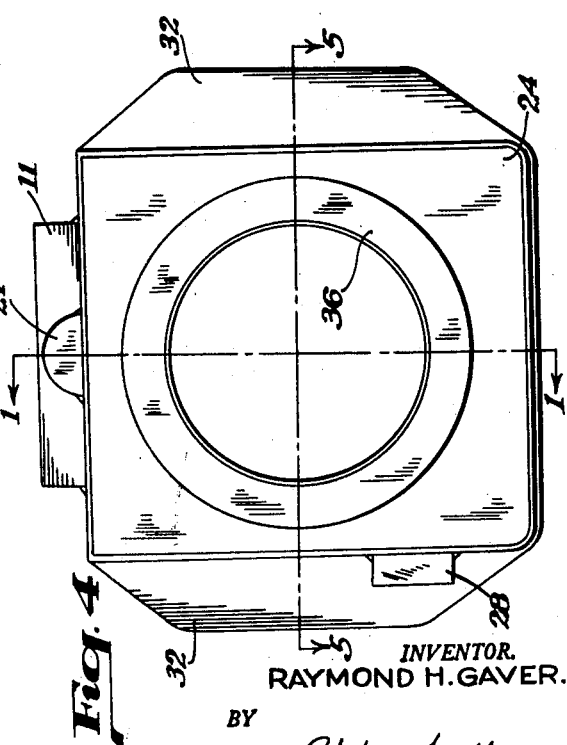
INVENTOR.
RAYMOND H. GAVER.
BY
*Richey Watts*
ATTORNEYS.

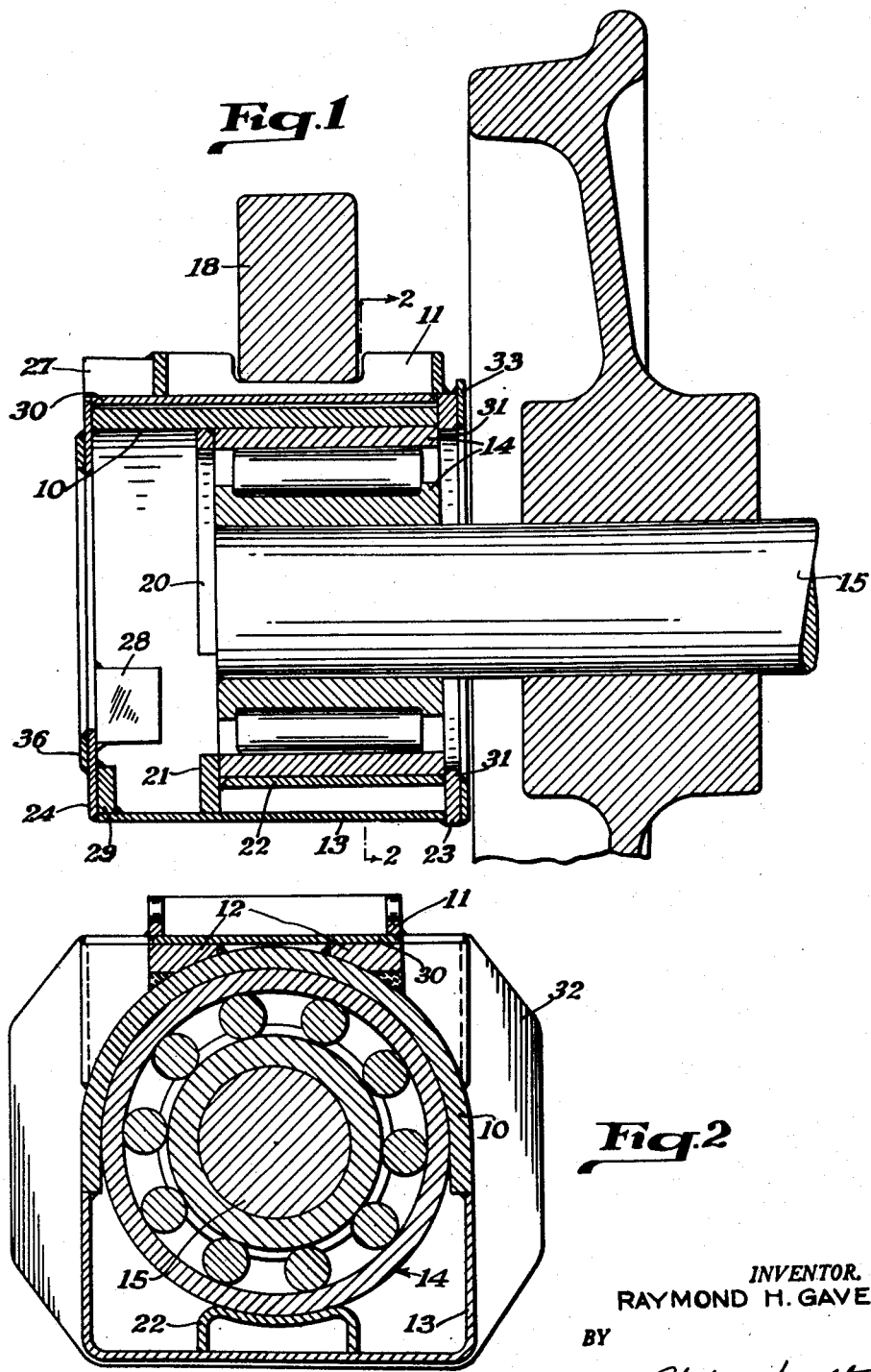

Patented Feb. 14, 1950

2,497,403

UNITED STATES PATENT OFFICE 2,497,403

ROLLER BEARING HOUSING

Raymond H. Gaver, Warren, Ohio, assignor to The American Welding & Manufacturing Company, Warren, Ohio, a corporation of Ohio Application September 30, 1947, Serial No. 776,944

2 Claims. (Cl. 308—180)

The present invention relates generally to journals for wheeled vehicles and is more particularly concerned with a novel and economical fabricated roller bearing housing.

Until recently, railway car journal boxes have all been castings and have been objectionable because of their weakness and tendency to fail under shocks received in normal use. In efforts to devise journal boxes of improved strength and shock resistance, others have attempted to fabricate them by welding a plurality of metal parts together. The resulting boxes, however, have not only been very expensive compared to the cast type, but have exhibited certain weaknesses and defects which have limited their use and commercial success.

In accordance with the present invention, a fabricated roller bearing housing, such as a railway journal box, having strength and shock resistant characteristics superior to previous cast and fabricated journal boxes, may be produced. Furthermore, my journal box or housing, because of its novel design, may be produced more economically than prior fabricated constructions of this type, and in some cases at a cost comparing favorably with that of cast boxes. My present housings are preferably of welded construction, and are made from a number of easily and economically manufactured, simple thin rolled metal plates which are easily assembled and secured together. An additional important advantage of my journal boxes is that they are especially well suited to the distribution of loads from the side frames, through the journal bearings and to the axle and wheels of railway cars. According to this invention no individual small element or small part of an element is required to withstand great stresses compared to the other elements or portions of an element, and it is therefore possible to minimize the differences in dimensions of the various parts and to avoid the necessity of large masses of metal in the construction.

By referring to the drawings accompanying and forming a part of this specification, those skilled in the art will gain a further understanding of the nature of this invention and the considerable departure from, and improvement upon, the prior art, which it constitutes.

In the drawings,

Figure 1 is a vertical, central, cross-sectional view of a journal box of one form of this invention in assembly with a railway car wheel, axle and load bar;

Figure 2 is a transverse, cross-section of the journal box of Figure 1 taken on line 2—2 of Figure 1;

Figure 3 is a top plan view of the housing of Figure 1;

Figure 4 is a front view in elevation of said housing;

Figure 5 is a view taken on line 5—5 of Figure 4; and

Figure 6 is a side elevational view of said housing.

In a very general way, a housing or journal box of the present invention comprises an upper semi-cylindrical member 10 having an inner surface for engagement with a cylindrical housing face of a roller bearing, a load box 11 above member 10, fillers or load blocks 12 between box 11 and member 10, and means for positioning and guiding a railway car load bar 18. In more detail, in a preferred and herein illustrated form, this invention comprises, in addition to the foregoing elements, a lower-channel member 13 welded along its edges to the edges of upper member 10 to define a housing having a rounded top in which to receive a roller bearing assembly 14 and an end portion of a railway car axle 15, upper and lower ribs 20 and 21 defining aligned thrust shoulders for preventing relative endwise or axial movement of the roller bearing race in the housing, a roller bearing seat 22 secured to member 11 to engage and support the bearing race and prevent vertical movement of roller bearing assembly 12 within the housing, and a back plate 23 and a front plate 24. Front and rear upper column bearing surfaces 25 and 26 comprising box-like sections situated adjacent to the upper portion of the housing on both sides of member 10, provide clearance for the load bar with maximum column bearing surface. A heat indicator boss 27, a filling plug boss 28 and a drain plug boss 29 are provided in the customary places and for the usual purposes, but are preferably separately made and welded in place.

Load blocks 12 are co-extensive in length with upper member 10 and are welded to the outer surface of said member on either side of its longitudinal midsection, extending over a substantial portion of said outer surface with weld metal filling the spaces between the horizontally extending outer edges of the blocks and the opposing curving upper surface of the housing. A rectangular metal top plate 30 covering the load blocks is supported by and welded to them, and in turn supports load box 11 which is about three-quarters as long and substantially the same width as plate 30 and welded to the top of said plate.

Back plate 23 has a shape generally similar to the transverse cross-sectional shape of the housing and has an enlarged central aperture through which roller bearing assembly 14 and axle end 15 may be inserted into the housing, and is welded to the back of the housing. The back plate is relatively wide, defining wing-like projections 32 along the sides of the journal box, and is provided with a gasket bearing ring 33 welded to the outer surface of the plate. Front plate 24 has a gasket bearing ring 36, likewise welded to the outer surface of the plate, covers the front of the journal box and has an enlarged and generally circular opening affording access to the interior of the box which may be closed by means of a door (not shown) bolted in the usual way to plate 24.

Upper column bearing surfaces 25 and 26 comprise sheet metal box-like shapes having rounded opposing outside corners and edge portions cut away to conform to the upper section 10. Front surfaces 25 are joined along the edges of their open side to front plate 24 and are connected to top plate 30 and upper section 10 along their edges. Rear surfaces 26 are similarly arranged and secured except that they are connected to back plate 23 rather than to the front plate. Each pair of upper column bearing surfaces define a vertical groove or channel along the upper section of the journal box of the same width but substantially greater depth than the recess in load box 15.

Upon consideration of the drawings the reasons for the unusual strength and durability characteristics of the structures of this invention will become apparent. In the first place, in normal use none of the parts is subjected to shear stresses, but rather all under compression which they are best suited to withstand. Furthermore, due to the shape of member 10 and the manner in which load box 11 is supported on said member, forces transmitted from the load bar to the axle are distributed through a relatively large mass and surface of member 10 so that no small portion of said member is required to withstand a large part of such forces.

Having thus described the present invention so that those skilled in the art may be able to practice and understand the same, I state that what I desire to secure by Letters Patent is defined in what is claimed.

What is claimed is:
1. A fabricated railway car journal box comprising an upper semi-cylindrical member having an inner surface disposed downwardly for engagement with an outer element of a bearing race, a lower channel-shaped body having side walls welded along their edges to the opposing edges of the upper member, a top wall above the upper member and spaced therefrom, a recessed load box carried by the top wall and extending upwardly therefrom to receive a railway car load bar, and means for supporting the top wall in position on the upper member comprising a pair of load blocks extending longitudinally of the said member and welded thereto on opposite sides of the longitudinal centerline of said member.

2. A fabricated railway car journal box comprising an upper semi-cylindrical member having an inner surface disposed downwardly for engagement with an outer element of a bearing race, a lower channel-shaped body having side walls welded along their edges to the opposing edges of the upper member, means for limiting relative endwise motion of a bearing race in the housing including a semi-cylindrical rib secured to the inside surface of the upper member and a rib secured to the inside surface of the lower member, a top wall above the upper member and spaced therefrom, a recessed load box carried by the top wall and extending upwardly therefrom to receive a railway car load bar, and means for supporting the top wall in position on the upper member comprising a pair of elongated load blocks extending longitudinally of the said member and welded thereto on opposite sides of the longitudinal centerline of said member, said load blocks having concave portions of curved surfaces to receive and engage portions of the said upper member.

RAYMOND H. GAVER.

REFERENCES CITED

The following references are of record in the file of this patent:

FOREIGN PATENTS

| Number | Country | Date |
| --- | --- | --- |
| 39,443 | Sweden | Jan. 20, 1913 |
| 512,843 | Great Britain | Sept. 27, 1939 |